Figure 1:
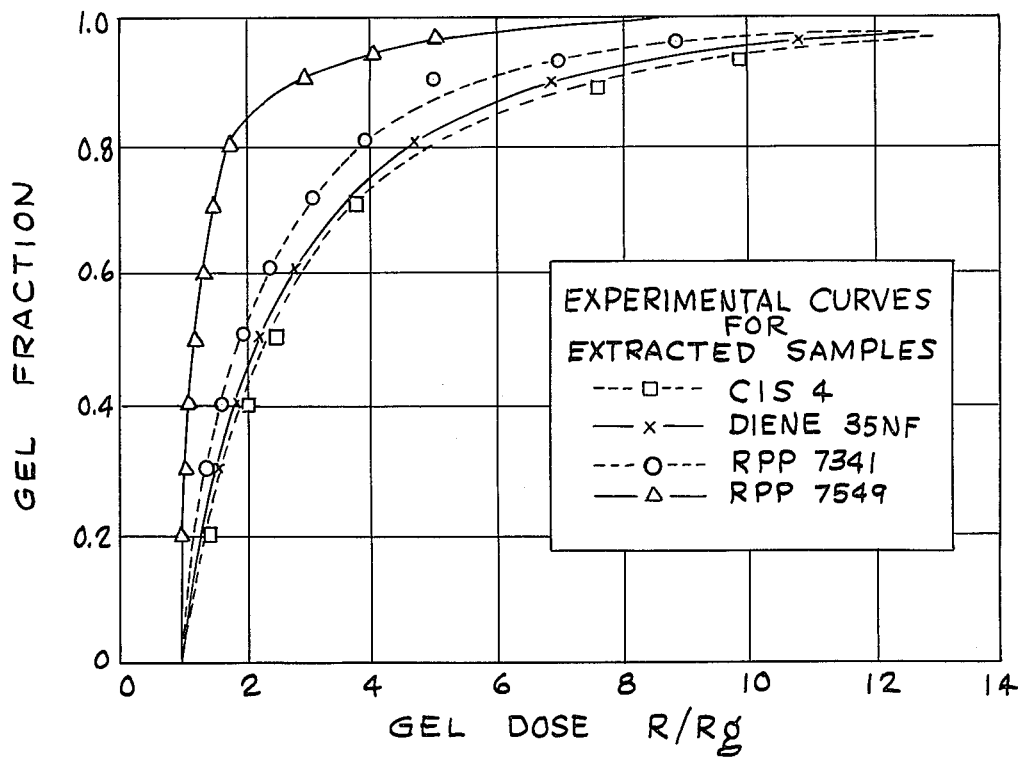

United States Patent [19]

Böhm et al.

[11] 4,102,761

[45] Jul. 25, 1978

[54] RADIATION CURE OF SYNTHETIC RUBBERS

[75] Inventors: Georg Gustav Anton Böhm, Akron, Ohio; Bolesh J. Skutnik, Milford, Conn.

[73] Assignee: The Firestone Tire & Rubber Company, Akron, Ohio

[21] Appl. No.: 581,493

[22] Filed: May 28, 1975

Related U.S. Application Data

[63] Continuation-in-part of Ser. No. 430,425, Jan. 3, 1974, abandoned, which is a continuation of Ser. No. 148,696, Jun. 1, 1971, abandoned.

[51] Int. Cl.$^2$ .............................................. C08F 2/46
[52] U.S. Cl. .......................... 204/159.20; 204/159.18; 260/892; 526/20; 526/281; 526/335; 526/336; 526/337; 526/339; 526/340

[58] Field of Search ............. 204/159.17, 159.20, 204/159.14; 260/4, 5, 80.78, 588, 889, 83.7, 94.2 R, 880 R, 880 B, 892, 876 R, 876 R; 526/20, 335, 336, 337, 339, 340, 281

[56] References Cited

U.S. PATENT DOCUMENTS

| | | | |
|---|---|---|---|
| 3,367,922 | 2/1968 | Sonnenfeld et al. | 260/80.78 |
| 3,427,264 | 2/1969 | Forster et al. | 260/892 X |
| 3,492,371 | 1/1970 | Barrett | 260/889 |
| 3,514,417 | 5/1970 | Bickel et al. | 260/889 |
| 3,616,362 | 10/1971 | Soldatos | 204/159.14 |
| 3,652,729 | 3/1972 | Brodoway | 260/878 R |
| 3,953,409 | 4/1976 | Komatsu et al. | 526/336 X |
| 3,980,625 | 9/1976 | Sakamoto et al. | 526/340 X |
| 3,984,610 | 10/1976 | Elston | 526/336 X |

*Primary Examiner*—Murray Tillman
*Assistant Examiner*—Thurman K. Page

[57] ABSTRACT

Synthetic rubber compositions and method of radiation curing such compositions at low average radiation dose wherein the compositions are characterized by defined distribution of radiation rate enhancing and inhibiting monomers.

10 Claims, 2 Drawing Figures

RADIATION CURE OF SYNTHETIC RUBBERS

RELATED APPLICATION

This application is a continuation-in-part of patent application Ser. No. 430,425 filed Jan. 3, 1974, which is, in turn, a continuation of patent application Ser. No. 148,696 filed June 1, 1971 both now abandoned.

BACKGROUND OF INVENTION

Conventionally rubber, both natural and synthetic, has been cured or vulcanized by heat treatment in the presence of sulfur or sulfur containing compounds such as mercaptans. By these means, which are well known, very good physical properties including tensile strength, modulus, elongation at the break, and the like, have been achieved. The techniques have been used commercially with a wide variety of synthetic rubbers prepared by both emulsion and solution polymerization.

Surfur and most sulfur containing compounds, unfortunately, have characteristically offensive odors. The art has long sought to avoid this problem, and has succeeded to some extent by the use of sulfur containing compounds of rather complex organic structure. There has been no decrease in the desirable properties of vulcanized rubbers as a result of the use of these compounds. However, other problems remain. Pressure molds are required for heat processing. The energy requirements are high. Heat processing of this type is difficult to automate.

For these and other reasons, the radiation curing or vulcanization of rubber has attracted considerable attention. With radiation, there is no odor problem and the procedure, as applied to other substrates, has been shown to be fast, clean and efficient... well adapted to modern, high speed, mass production, commercial operations. The process is readily automated, the energy requirements are appreciably reduced, and pressure molds are not required. However, despite a great deal of work and many promising literature reports, radiation procedures have not been successfully adapted to the commercial vulcanization of rubber. It has proved to be difficult, at any economically feasible radiation dose, to produce vulcanized rubbers having physical properties as good as rubbers vulcanized with ordinary sulfur heat cures.

The principal problem which has plagued investigators attempting to adapt radiation techniques to the curing of rubber is that it has not proved possible to effect radiation cure of substantially pure synthetic rubbers at a low average dose, for example up to 7 megarads. The value of 7 megarads for the average dose, i.e., the average dose throughout the thickness of the substrate, is important for the reasons stated below. For a proper understanding of this invention, average dose and surface dose should be carefully distinguished. The former refers to the average radiation dose throughout the thickness of the substrate. The latter refers to the dose at the surface. Normally an average dose of 9 megarads corresponds to a surface dose of about 7 megarads with relatively thin sheets of about 70 to 90 mils and an electron energy of approximately 1.5 Mev. (1) Many of the additives which are ordinarily added to rubber compositions in the course of compounding them for their ultimate commercial use are radiation cure inhibitors. As a result of the presence of these inhibitors, the average radiation dose required for curing is so high that the cost is prohibitive. If the pure synthetic rubber is to be used in the final composition cures at a dose level below 7 megarads, the presence of those additives which are normally employed in commercial rubber compounding will not inhibit curing by high energy ionizing radiation to the point where radiation curing is impractical.

(2) In some commercial operations, it is desirable to partially cure a rubber composition in one phase of the operation and to complete the cure in another. The partial curing may be effected by radiation. The cure may be completed by heat. The compound, therefore, will contain normal heat cure additives. The heat generated by treatment of synthetic rubber compositions increases with increasing radiation dose. If the dose to obtain a partial radiation cure is too high, the heat generated to reach this dose level may initiate the heat cure system to effect a partial heat cure as well. As a result, it would not be possible to properly control the partial cure.

(3) Radiation curing at low doses can be carried out without unnecessary increases in temperature. This is very important. Normally an increase of one Mrad in radiation dose corresponds to an increase in temperature of about 5° C. Therefore if a relatively volatile material is present in the rubber to be cured, it is essential to maintain the radiation dose at a low level to prevent the development of undesirable porosity in the cured rubber as a result of "blowing" of the volatile material. For example, if blowing takes place at 100° C and radiation curing is initiated at 25° C, the upper level of permitted dose is 15 Mrad.

(4) Side reactions such as polyene formation, scission, isomerization and cyclization which change the nature of the compound being treated are reduced to a tolerable level by avoiding high radiation dosages.

Curing of rubbers is effected by crosslinking the polymer chains. With sulfur cures crosslinking takes place through sulfur links. With radiation curing crosslinking is normally through carbon-carbon bonds of adjacent polymer chains. As a result of such crosslinking, the rubber becomes less tacky and physical properties such as modulus, tensile strength, elongation at the break, ultimate elongation and other desirable properties improve. No radiation curing procedure has yet been devised which, without special formulations which increase cost and complexity, is capable of curing synthetic rubbers to produce finished products having physical properties comparable with sulfur cured products.

THE INVENTION

It has now been discovered that certain selected synthetic rubbers can be cured utilizing high energy ionizing radiation at doses which are sufficiently low to be commercially useful. Moreover, the vulcanized or cured rubbers produced have physical and chemical properties which compare favorably with the same rubbers cured by the sulfur method.

The synthetic rubbers which are useful in the practice of this invention are diolefin rubbers prepared by polymerization or copolymerization with an olefin or vinyl monomer. They include, for example, polybutadienes, polyisoprenes, various copolymers of conjugated diolefins and vinyl compounds such as SBR (copolymers of butadiene and styrene) and NBR (copolymers of butadiene and acrylonitrile, copolymers of butadiene or isoprene with alpha methyl styrene, ring substituted styrenes, chloromethyl styrene, copolymers of butadiene and isoprene, copolymers of isobutylene and cyclopentadiene, vinyl pyridine polymers, terpolymers containing ethylene, propylene, and other monomers such as ethylidene norbornene. Such rubbers can be prepared from the appropriate diolefin and/or olefin monomers by emulsion polymerization or by solution polymerization. Solution polymerized products are preferred because of their relatively high purity. Accordingly, the process of this invention comprises the radiation vulcanization or curing of selected synthetic rubbers containing diolefin with or without the addition of direct or indirect radiation, vulcanization promoters at average dose levels of from 0.5 to 7 megarads. In preferred embodiments of the invention, novel compositions which cure at average dose levels as low as 0.5 to 5 megarads are employed.

The desired curing can be accomplished in accordance with this invention by subjecting the rubber to be cured to an adequate dose of high energy radiation. Typically useful high energy sources of radiation include gamma rays, X-rays, beta rays and accelerated electrons, protons, and alpha particles. Electrons accelerated through 300,000 volts or more, gamma rays and X-rays are generally the most practical energy sources.

The radiation can be carried out by passing the composition, suitably in the form of a thin layer or sheet, through a beam of high energy electrons under conditions that will give the desired total dose. Typically the dose rate is from about 0.02 to 5 megarads per second, although appreciable variation is possible. With electrons of 1.5 MeV or higher energy, sheets up to about 0.25 inches can be effectively irradiated from one side alone. With thicker sheets, for example, up to 0.5 inches, optimum results are normally achieved by two passes through the electron beam, first on one side and then on the other, or by the use of sources on both sides. However, linear accelerators are now available which will penetrate 0.75 inch or higher, and these may be used to avoid the use of two passes.

Compositions in shapes other than sheets can be cured by procedures which are well known to those skilled in the art.

Conventional radiation equipment and techniques can be employed in the practice of this invention. For example, the desired amount of irradiation can be obtained using a 300 kev electron accelerator which emits a circular beam of electrons from a heated cathode filament. The electrons are guided through a scanning magnet and emerge through a thin titanium window which is approximately 1 by 24 inches. A beam power of 3 kw is obtained at an operating current of 10 mamps. The dose delivered can be measured using the well known blue cellophane technique, Henley and Richman; Anal. Chem. 28, 1580 (1950). By altering the beam current, beam diameter and distance to the source, various dose rates of radiation can be obtained.

This invention will be better understood if certain definitions are kept in mind.

Weight average molecular weight (Mw) is the molecular weight of polymers determined by methods which depend upon the weights of molecules present, such as light scattering, sedimentation equilibrium, or viscosity.

Number average molecular weight (Mn) is the molecular weight of polymers determined by methods which depend upon the number of molecules present, such as titration of end groups or osmotic pressure methods.

Mw and Mn are usually not the same for any given sample of polymer. Both, of course, represent the average of the molecular weight of all of the molecules present in the sample.

Molecular weight distribution is the relative amounts of polymers of different molecular weights that comprise a given specimen of polymer. Two samples of the same polymer with the same Mw or Mn may perform quite differently in processing because of different molecular weight distribution. The ratio Mw/Mn is a convenient approximate indication of the molecular weight distribution of a specific polymer.

Monomer, unless specifically characterized, as used in this application means not only those units of a polymer which are chemically different such as butadiene and styrene in a copolymer of these products, but also structural isomers such as cis, trans and vinyl isomers of the same chemical entity. In this sense a polymer such as polybutadiene is, in fact, a copolymer since it contains a number of structural features. A homopolymer in the structural sense would contain only one monomer, and would have only one structural configuration, for example all cis or all vinyl. Since, as will be explained, each monomer is a factor which contributes to the overall radiation cure rate of the polymer, the term "factor" is sometimes used herein as a convenient analog for the term "monomer".

G(crosslink)$_{Xi}$ is the yield of crosslinks formed by the reaction of monomer units of the type $X_i$ for each 100 electron volts absorbed by these units in a polymer or copolymer; wherein $X_i$ is any monomer unit in the group $X_1, X_2, X_3 \ldots X_n$, for example, cis butadiene.

$\overline{G(crosslink)}$ is the average yield of crosslinks in a polymer or copolymer composed of monomer units of the type $X_1, X_2, X_3 \ldots X_n$ present in concentrations expressed in mol fractions $n_1, n_2, n_3 \ldots n_n$ and contributing to the overall yield of crosslinks, or rate of cure, of the polymer or copolymer composition through their respective contributions G(crosslink)$_{X1}$, G(crosslink)$_{X2}$, G(crosslink)$_{X3} \ldots$ G(crosslink)$_{Xn}$.

Many factors contribute to the structure of a particular polymer specimen. The molecular weight may cover a broad or a narrow spectrum. Individual monomers in a copolymer may be randomly distributed or in block formation, or there may be a mixture of both. There may be a large number of vinyl, cis or trans groups and these may be distributed randomly or be relatively concentrated in a particular molecular weight fraction. Such values as Mw, Mn and molecular weight distribution may vary appreciably in polymers produced from the same chemical monomers.

Factors such as molecular weight, molecular weight distribution and percent comonomer in copolymers are generally regarded as macrostructure factors. Factors such as distribution of a monomer in a particular molecular weight fraction or distribution of double bonds in the cis, trans or vinyl configuration in either the low molecular weight fraction or the high molecular weight fraction are regarded as microstructure factors.

Synthetic rubbers may be prepared by solution polymerization or by emulsion polymerization utilizing procedures well known in the art. These procedures may be adapted to produce products with widely diverse macrostructure or microstructure. Copolymers of butadiene and styrene, for example, can be prepared in which the molecular weight distribution can be as low as 1.01 or as high as 30. The molecular weight may vary from as low as 25,000 to as high as 1,000,000 or higher. Substantially all of the styrene may be in the low or the high molecular weight fraction. Of the double bonds present, as low as 1% or substantially all may be cis, trans or vinyl. The major proportion of the double bonds in a particular configuration may be in the low molecular weight fraction, the high molecular weight fraction, or they may be randomly distributed. These results can be achieved by varying such reaction conditions as temperature, time, rate of mixing, order of mixing, catalyst, and the like.

The art is well aware of these methods and procedures, many of which are described below. More specific details will be found in the references cited.

1) Variation of molecular weight and molecular weight distribution.

In the alkyllithium initiation of butadiene, isoprene, or styrene, homo-, co-, or terpolymers, the molecular weight is determined by the ratio of monomer to initiator used (M. Morton et al, J. Polymer Sci., Al, 475, 1963). It is thus possible to produce any desired molecular weight with the upper limit being established by the purity of the materials used. The molecular weight distribution may in turn be varied by several processes based upon the above catalyst system.

A. Initiator may be added during polymerization thereby creating more chains such that at complete conversion a wide variation in chain lengths can be obtained.

B. The effect of backmixing in a continuous process will lead to changes in the molecular weight distribution. If the life time of the chain is long relative to the average residence time in the reactor, backmixing will broaden the molecular weight distribution. Such would be the case in the previously mentioned system (Denbigh, G. K., Trans. Faraday Soc. 43, 643, 1947).

These procedures may be combined in a process to produce any desired molecular weight distribution. There are numerous articles in the process engineering literature discussing such procedures and combinations 2) Distribution of monomer content according to molecular weight.

Several methods are possible to produce polymers with preselected monomer distribution.

In emulsion polymerization, the molecular weight is often controlled by the use of chain transfer agents such as mercaptans. The modifiers may be added initially, incrementally or throughout the polymerization with each method producing polymers of differing molecular weight and molecular weight distribution. It is also possible to add one monomer during the process thereby controlling the composition of the polymer as a function of conversion. By combining these techniques, it is possible to control the molecular weight and monomer distribution.

As another example, in solution polymerization, using alkyllithium, the monomer content, for example the styrene content, may be controlled by a variety of methods: incremental or continuous addition of one monomer, initial charge process, incremental or continuous addition of two monomers. All of these methods can lead to selected and controlled variations in monomer distribution with the extremes being true random copolymers and the block polymers. (I. Kuntz, J. Polymer Sci., 54, 569 (1961); U.S. Pat. No. 3,094,512 (1963); Belgian Pat. No. 634,869 (1964); British Patent No. 1,136,189 (1968)).

3) Distribution of double bonds in a particular configuration according to molecular weight.

The addition of polar agents is known to modify the microstructure of conjugated diolefin polymerization when polymerized using alkyllithium as a catalyst. While predominantly 1,4 addition occurs in hydrocarbon media, vinyl addition is favored in polar solvents (L. E. Forman, "Polymer Chemistry of Synthetic Elastomers", Part 2, J. P. Kennedy and E. Tornquist, Ed., Interscience Publishers, New York, N.Y. 1969, Chapter 6). Combining the incremental addition of polar agents with polymer terminators will lead to simultaneous variation of microstructure and molecular weight.

It is also possible to obtain rubber compositions with diverse microstructure or macrostructure by blending independently prepared synthetic rubbers. For example, a butadiene homopolymer of low molecular weight with most of the double bonds in the vinyl configuration can be blended with a sample in which the vinyl bonds are randomly distributed to produce a final blend in which a major proportion of the double bonds present are in molecules of relatively low molecular weight.

It has been discovered that in synthetic rubbers there are factors or monomers which inhibit radiation curability and factors or monomers which enhance radiation curability; and that for curing polymers containing these monomers to produce useful products at practical radiation dose levels, the former should be in the higher molecular weight fractions and the latter in the lower molecular weight fractions.

For any polymer or polymer blend, it is possible to determine which monomers inhibit its radiation curability and which ones enhance its radiation curability by obtaining the value of the fraction.

$$\frac{G(\text{crosslink})_{X_i}}{\overline{G}(\text{crosslink})}$$

If the ratio is less than 0.5, the monomer represented by $X_i$ inhibits radiation curability, and if the ratio is greater than 1.5, the monomer represented by $X_i$ enhances radiation curability.

It has been discovered that when the value of the fraction is less than 0.5 not more than 50% of all the $X_i$ monomers present in the polymer should be distributed in molecules having a molecular weight less than the weight average molecular weight. When the value is greater than 1.5 not less than 50% of all the $X_i$ monomers present in the polymer should be distributed in molecules having a molecular weight less than the weight average molecular weight. Provided that these conditions are fulfilled and the product is a diolefin rubber or olefin rubber copolymerized with a diolefin having a molecular weight distribution of 1.01 to 30 preferably 1.5 to 10 and a weight average molecular weight greater than 50,000, it will be curable at an average radiation dose of from 0.5 to 7 megarads to produce useful cured products. The most practical weight average molecular weight range is from about 50,000 to 900,000.

Once the value of this disclosure and its application is appreciated, it is possible to prepare novel compositions which can be cured by radiation at average doses as low as 0.5 to 7 megarads. To do so, it is only necessary to determine those factors which are inhibitory and those which are enhancing. Novel compositions can then be prepared either by direct synthesis or by blending as described above to prepare blends in which the major portion of the inhibitory factors are in high molecular weight molecules, and the major portion of the enhancing factors are in the low molecular weight molecules.

The value of $\overline{G}(\text{crosslink})$ can be determined by any of the known methods for obtaining crosslink yields in polymers, such as swelling measurements or solubility measurements. The value of $G(\text{crosslink})_{X_i}$ may be determined either by making use of the approximate relation $$\overline{G}(\text{crosslink}) = \sum_{1}^{N} n_i G(\text{crosslink})_{X_i}$$

where $n_i$ is the mole fraction of monomer unit $X_i$ in a polymer composed of N different monomer units and then solving N equations in N unknown to obtain each $G(\text{crosslink})_{X_i}$ or by measuring the crosslink yield in a polymer composed essentially of monomers of the type $X_i$.

The principal factors which affect radiation curability have been suggested above. It is not meant to imply, however, that these are the only factors, since these will vary from polymer to polymer. A few simple observations will readily permit those skilled in the art to determine the rate contribution from the various microstructure and macrostructure factors of the polymer system under consideration. The product for radiation curing can then be synthesized or blended as described above. To determine the applicability of a particular product for use in this invention it should be pure; that is, it should be substantially free of residual catalyst, solvent, surfactant, water or other materials. It will be understood that the final radiation curable composition may contain other ingredients such as heat curing agents, antioxidants, tackifiers, plasticizers, various fillers such as carbon black, hard rubber dust, and the like, in the amounts normally employed in the synthetic rubber compositions of commerce. These final compositions can be radiation cured at commercially practical dose levels, i.e. up to 15 megarads average dose without interference from heat generation when their major component is a synthetic rubber composition of this invention.

The radiation curable synthetic rubbers of this invention are diolefin polymers and copolymers having a weight average molecular weight of at least 50,000 to 900,000, a molecular weight distribution of from 0.01 to 30, the distribution of monomer units affecting the total crosslinking rate being such that when the value of the fraction $$\frac{G(\text{crosslink})_{X_i}}{\overline{G}(\text{crosslink})}$$

is greater than 1.5, from 50% to 100% of the monomer whose crosslinking rate contribution is represented by $G(\text{crosslink})_{X_i}$ is in molecules having a molecular weight which is less than the weight average molecular weight of the synthetic rubber; and when the value is less than 0.5, up to 50% of all of the monomer whose rate contribution is represented by $G(\text{crosslink})_{X_i}$ is in molecules having a molecular weight less than the weight average molecular weight of the synthetic rubber, the values for $G(\text{crosslink})_{X_i}$ and $\overline{G}(\text{crosslink})$ being as defined above.

One important aspect of this invention is that by its use, polymers with a wide molecular weight distribution can be cured as though their molecular weight distribution were narrow.

The molecular weight distribution of commercial polymers is normally quite broad. The ratio of Mn:Mw is two or greater. One of the principal reasons for this is that it is less expensive and requires less complicated manufacturing techniques to produce such polymers. Moreover polymers with wide molecular weight distribution have improved processing properties compared with those having narrow distributions. However, a disadvantage of such polymers is that curing with radiation requires high dosages, and is therefore expensive.

Stated another way, polymers which have the same molecular weight, but different molecular weight distributions will have different dosage requirements for curing. For example, a polymer with an Mn:Mw ratio of 5 may require 300% more dosage to reach 95% gel than a polymer with an Mn:Mw ratio of 1.1.

By taking advantage of this invention, the dosage requirement gap can be considerably narrowed. By modifying the microstructure of the polymers to be cured so as to incorporate the rate enhancing factors in the low molecular weight molecules, the resulting polymers can be cured at relatively low dosages even though the molecular weight distribution ratio remains high. It is thus possible to retain the benefits of high molecular weight distribution while attaining the advantages of radiation cure without increased production costs.

There follows one illustration of the advantages to be realized by the practice of this invention: Two styrene-butadiene copolymers were prepared which contained equal amounts of styrene. Styrene is a retarding monomer having a crosslinking rate of 0.03 [G(X)] whereas butadiene crosslinks rapidly. Its crosslinking rate depends upon the isomers present — cis, trans or vinyl — and is in the range of 1 to 4. Therefore, to maximize the crosslinking rate for a styrene-butadiene copolymer, the styrene monomer should be placed primarily in the high molecular portion of the polymer. Polymer A was prepared in this manner. The styrene monomer was distributed so that the lowest molecular weight material contained only 20% styrene. The concentration of styrene increased steadily with molecular weight with the highest molecular weight material containing 30% styrene. For comparison purposes, Polymer B was prepared in such a manner that all polymer molecules contained the same amount of styrene: i.e., 25%. The characteristics of these two polymers are listed in the following table:

| | Mw | Mw/Mn | % Styrene | Styrene Distribution |
|---|---|---|---|---|
| A | 244,000 | 2.82 | 27 | Majority in high molecular weight fraction |
| B | 256,000 | 2.36 | 25 | Uniform |

Samples of both of these polymers were exposed to increasing increments of radiation until they became insoluble in toluene (gelled). The crosslinking rate of the polymers could then be determined from their molecular weights and the radiation dose required to cause gellation. The crosslinking rate of Polymer A (G(X) = 1.40) was 38% greater than Polymer B (G(X) = 1.02). This shows that when a crosslinking rate retarding monomer — styrene — is used in a copolymer, it is advantageous to distribute the concentration of styrene so that it is primarily in the high molecular weight portion of the polymer.

It will be apparent that the process of this invention is applicable to a wide variety of substrates. These may be prepared by direct synthesis or by blending synthetic mixtures. For example, known, commercially available synthetic rubbers which have not heretofore been radiation curable in a practical manner can be blended with minor amounts of synthetic polymers specifically prepared to have low radiation dosage requirements for curing. The resulting blend will cure at much reduced radiation levels. It is, for example, possible to blend commercially available butadiene styrene copolymers which require radiation dosages as high as 15 Mrads with similar polymers especially prepared to be curable at dosage levels as low as 3 Mrads, and to thereby produce a blend which will cure at under 7 Mrads. Only relatively small amounts of the rate improving polymer are required to markedly decrease the total dosage requirements of the blend. The contribution of the low dosage requirement polymer is not on a weight for weight basis.

There are other elements which will contribute to the practicality of this invention. For example, indirect or direct radiation promoters such as para dichlorobenzene or ethylene glycol dimercaptoacetate may be added to the composition to lower the total dose requirements to the lower end of the dose range. Polyhydrosulfides such as those described and claimed in commonly assigned U.S. Pat. No. 3,843,502, the disclosure of which is incorporated herein by reference, are especially useful. They can be used, for example, at concentrations of from about 0.1% to 5% by weight, based on the total weight, to reduce the average dose requirements to from about 0.5 to 4 megarads. At these low levels, odor is not a serious problem. Mixtures of direct and indirect promoters may also be employed to decrease the average radiation dose even more.

Typically useful compounds include 1,2-ethane dithiol, 1,3-propane dithiol, tetramethylene dithiol, hexamethylene dithiol, the cyclohexane dithiols, 2,3-dimercaptopropanol-1, $\alpha,\alpha$-dimercaptoxylene, ortho-, meta- and paraphenylene dithiols, 1,10-dimercaptodecane, ethylene glycol dimercaptoacetate, dipentene dimercaptan, 2,2-diphenyl-1,3-propanediol dithioglycolate and trimethylolpropane trithioglycolate. Ethylene glycol dimercaptoacetate and trimethylolpropane trithioglycolate are especially preferred species because they have good reactivity at lower doses, their odor is not offensive, and they produce excellent products.

Para dichlorobenzene is a preferred indirect promoter. Others include ortho-, and meta-dichlorobenzene, ortho-, meta-and para dibromobenzene, ortho, meta- and para difluorobenzene, bromobenzene, chlorobenzene, chlorotoluenes; mono- or polychlorinated biphenyls, dichloronaphthalenes, chloroform, carbon tetrachloride, carbon tetrabromide, hexachloroethane, 1,2-dichloro-4-t-butylbenzene, t-butyl chloride, cyclohexyl bromide, $\alpha$-chlorotoluene, and $\alpha,\alpha'$-dichloroxylene.

This invention, while generally applicable to synthetic diolefin rubbers will be better understood by reference to some specific polymers.

With styrene-butadiene copolymers with a molecular weight distribution of 1.3 to 25 and a weight average molecular weight of from 50,000 to 900,000 the principal factors contributing to the rate of gel formation are the cis, trans and vinyl factors and the styrene concentration and distribution. The vinyl contribution is rate enhancing. The styrene contribution is rate retarding. Accordingly, the composition for radiation curing should contain up to 50% of the total styrene in molecules having a molecular weight less than the weight average molecular weight, and from 50% to 100% of the total vinyl content in the same molecules. In other words, the major portion of the styrene should be in the high molecular weight fraction, and the major portion of the vinyl in the lower molecular weight fraction. Ideally, the distribution should be such that the amount of styrene present in the low molecular weight fraction increases with molecular weight, and the amount of vinyl decreases.

With the terpolymer ethylene-propylene-ethylidene norbornene with a molecular weight distribtion of 2.0 to 25 and a weight average molecular weight of from 50,000 to 900,000 the principal crosslinking factors are the amount of norbornene, its distribution over the molecular weight range, and its sequential distribution in molecules, i.e., block or random. Since the norbornene is a crosslinking rate enhancing agent the major portion should be present in molecules having a molecular weight less than the weight average molecular weight.

This invention is particularly useful with terpolymers containing the monomers ethylene, propylene and ethylidene norbornene, containing from 70% to 30% ethylene, 30% to 70% propylene and 2% to 15% ethylidene norbornene in which the value of the above defined fraction is greater than 1.5 when $X_i$ is ethylidene norbornene and from 50% to 100% of the ethylidene norbornene is in molecules, the molecular weight of which is less than the weight average molecular weight of the terpolymer.

The principal contributing factor to the crosslinking rate in polybutadiene is the vinyl factor which has a rate enhancing effect. Therefore, the major portion should be in molecules having a molecular weight below the weight average molecular weight.

In the most preferred products of this invention, i.e. those which take optimum advantage of the discovery described herein, more than 75% of radiation rate enhancing monomers will be in the low molecular weight fraction, and more than 75% of radiation rate inhibiting monomers will be in the high molecular weight fraction. If two or more monomers are involved in a particular product, at least one of which is rate enhancing and at least one of which is rate inhibiting, maximum advantages are obtained with compositions in which the rate enhancing monomer is in the low molecular weight fraction and the rate inhibiting monomer is in the high molecular weight fraction. With these compositions which are most easily prepared by the blending technique described above, the average dose required for curing is at its lowest.

The following examples are given by way of illustration only, and should not be regarded as limitations of this invention many apparent variations of which are possible without departing from the spirit or scope thereof.

In the examples each polymer is milled and molded into plaques according to standard procedures. The irradiations are performed with a Dynamitron 1.5 MeV electron accelerator. All radiation doess are average doses.

EXAMPLE 1

Samples of the following polymers are extracted with acetone and then radiation treated as described above.

Cis 4 is a polybutadiene with an Mw of 578,000, a ratio of Mw/Mn of 3.5 and a vinyl content of 4%.

Diene 35 NF is a polybutadiene with an Mw of 405,000, a ratio of Mw/Mn of 3.3 and a vinyl content of 11.3%.

RPP-7341 is a polybutadiene with an Mw of 839,000, a ratio of Mw/Mn of 3.0 and a vinyl content of 45.5%.

RPP-7549 is a polybutadiene with an Mw of 330,000, a ratio of Mw/Mn of 1.3 and a vinyl content of 87.5%.

The gel growth curves for these polymers are given in FIG. 1 as a function of normalized dose. Note that the gel growth for RPP-7341 is considerably faster than for the two lowest vinyl content polymers even though the Mw/Mn of all three polymers are very similar. The unusually fast gel growth for RPP-7549 is due to its low Mw/Mn ratio and especially to its very high vinyl content. This behavior is attributable to an increase in the G(crosslink) value for vinyl unsaturation at the very high vinyl content level of this polymer over the G(crosslink) value of the other vinyl content levels. The advantage of increasing vinyl content both in the low to medium high range as well as the very high range is demonstrated by the relative G(crosslink) values for each type of unsaturation given below.

TABLE I

| | Polymer | G(crosslink) cis | G(crosslink) trans | G(crosslink) vinyl |
|---|---|---|---|---|
| 1. | Cis 4 | 1.0 | 1.2 | 2.1 |
| 2. | Diene 35 NF | 1.0 | 1.2 | 2.1 |
| 3. | RPP-7341 | 1.0 | 1.2 | 2.1 |
| 4. | RPP-7549 | 1.0 | 1.2 | 3.7 |

Thus the vinyl unsaturation is clearly more reactive to crosslinking, even at low levels, than the other type of unsaturation.

For this example, the G values are determined as described above for equations with three unknowns. First with samples 1, 2 and 3, and then with 1, 2 and 4. The most probable reason for the difference in G vinyl values is a difference in vinyl distribution.

The example shows that vinyl is a rate enhancing monomer. Therefore, when Diene 35 NF was blended, as described above, with a lower molecular weight (about 200,000) high vinyl content synthetic polybutadiene the blend exhibited a higher gel growth rate than that of Diene 35 NF because of the higher vinyl content in the molecules whose molecular weight is less than the weight average molecular weight of the blend.

EXAMPLE 2

Samples of the following polymers are treated as in Example 1.

Stereon 700 is a copolymer of butadiene (80%) and styrene (20%) with an Mw of 267,000 and a ratio of Mw/Mn of 1.9.

Stereon 750 is a copolymer of butadiene (80%) and styrene (20%) with an Mw of 604,000 and a ratio of Mw/Mn of 2.7.

The microstructure of the products is substantially the same.

Figure 2:
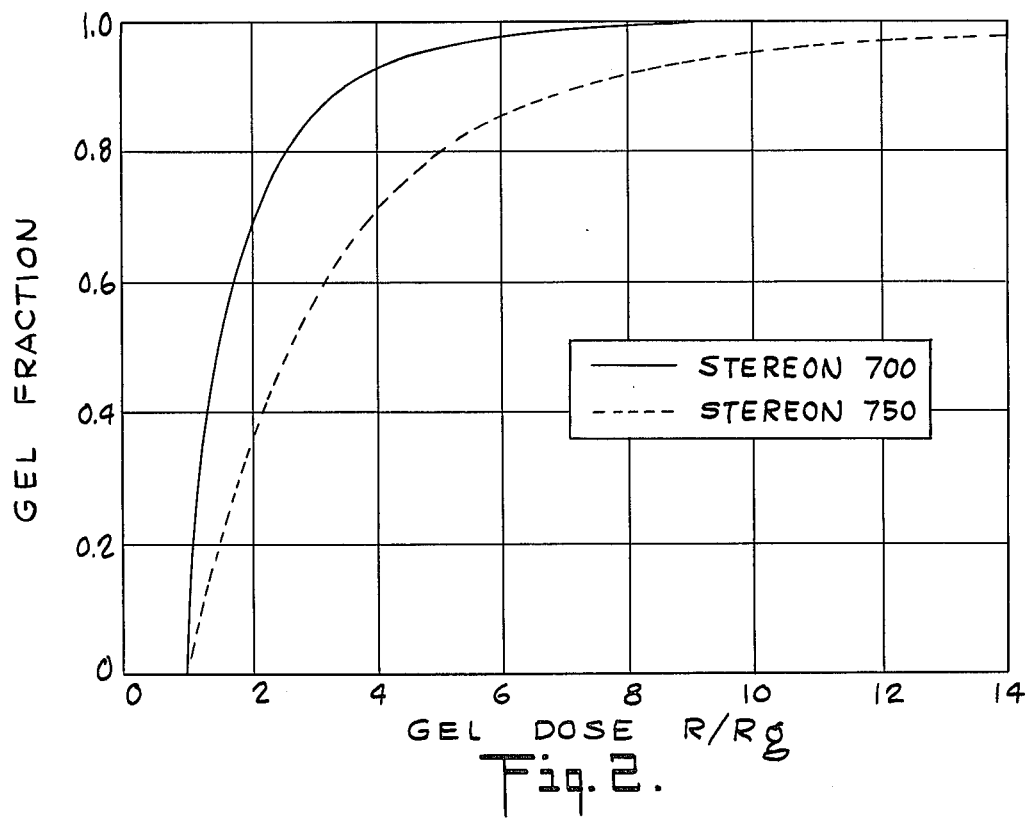

The gel growth curves for these polymers are given in FIG. 2 as a function of normalized dose. The much faster gel growth for Stereon 700 is due to its lower Mw/Mn ratio. This clearly shows the advantages of having a narrow molecular weight distribution.

Samples of Diene 35 NF and Stereon 700 are treated as in Example 1. The results given in Table II demonstrate the retarding of crosslinking due to the presence of styrene.

TABLE II

| Polymer | Gelling Dose Mrads | Dose for 50% Gel Mrads | Dose for 80% Gel Mrads | Dose for 95% Gel Mrads |
|---|---|---|---|---|
| Diene 35 NF | 1.22 | 2.86 | 5.72 | 12.2 |
| Stereon 700 | 2.82 | 4.55 | 7.25 | 12.2 |

The ratio of the gelling doses is over 50% larger than the inverse ratio of the Mw's of the two polymers (2.3 to 1.5, respectively). These ratios would be equal if the G(crosslink) of the two polymers was the same. Since the ratio of gelling doses is much larger, the G(crosslink) value for Stereon 700 must be smaller than that for Diene 35 NF. Note that since both polymers are made using the same catalyst system, the microstructure of the butadiene portions are equivalent. The effect of macrostructure is demonstrated in this example by the data which shows that 95% gel content is reached at the same dose for both polymers, even though the gel point for Diene 35 NF is much lower than for Stereon 700.

These experimental findings were utilized to prepare new compositions. Thus when copolymers were prepared with a butadiene content of 80% and a styrene content of 20% having a molecular weight of about 267,000 and a molecular weight distribution of about 1.9, but with most of the styrene in molecules having a molecular weight greater than the weight average molecular weight of each sample the average radiation dose necessary for curing was below 7 megarads and approached 6.5 megarads as the amount of styrene in the high molecular weight fraction increased.

When blends of the same types of rubber were prepared such that more than 50% of the vinyl content was in the low molecular weight fraction and more than 50% of styrene content was in the high molecular weight fraction the average curing dose was below 6.5 megarads and approached 6 megarads with the optimum blends.

In both instances best results were obtained when more than 75% of the rate inhibiting monomer was in the high molecular weight fraction and more than 75% of the rate enhancing monomer was in the low molecular weight fraction.

Cis 4 is a trade name of Phillips Petroleum Company.

Diene 35 is a trade name of The Firestone Tire & Rubber Company

Stereon is a trade name of The Firestone Tire & Rubber Company.

What is claimed is:

1. An uncured synthetic rubber composition curable by high energy ionizing radiation at an average radiation dose of up to 15 megarads the major component of which comprises a copolymer containing at least one diolefin polymer or copolymer with another monoolefin having a weight average molecular weight of at least 50,000, a molecular weight distribution of from 1.01 to 30, the distribution of monomer units affecting the total crosslinking rate being such that when the value of the fraction.

$$\frac{G(\text{crosslink})_{X_i}}{\overline{G}(\text{crosslink})}$$

is greater than 1.5, from 50% to 100% of the monomer whose crosslinking rate contribution is represented by $G(\text{crosslink})_{X_i}$ is in molecules having a molecular weight less than the weight average molecular weight of the synthetic rubber, and when the value is less than 0.5, up to 50% of the monomer whose crosslinking rate contribution is represented by $G(\text{crosslink})_{X_i}$ is in molecules having a molecular weight less than the weight average molecular weight of the synthetic rubber; the value of said fraction in said composition being less than 0.5 or more than 1.5; said composition when substantially pure being radiation curable at an average radiation dose of from 0.5 to 7 megarads.

2. A composition as in claim 1 wherein the weight average molecular weight is from 200,000 to 750,000 and the molecular weight distribution is from 1.5 to 10.

3. A composition as in claim 1 wherein the synthetic rubber is a copolymer of butadiene and styrene containing from up to 50% by weight styrene, the value of the fraction is less than 0.5 when $X_i$ is the styrene monomer and up to 50% of all the styrene is in molecules having a molecular weight which is less than the weight average molecular weight of the synthetic rubber.

4. A composition as in claim 3 wherein the weight average molecular weight is from 200,000 to 750,000 and the molecular weight distribution is from 1.5 to 10.

5. A composition as in claim 1 wherein the synthetic rubber is polybutadiene, the value of the fraction is greater than 1.5 when $X_i$ is vinyl monomer and 50% to 100% of the vinyl unsaturations are in molecules the molecular weight of which is less than the weight average molecular weight of the polybutadiene.

6. A composition as in claim 5 wherein the weight average molecular weight is from 200,000 to 750,000 and the molecular weight distribution is from 1.5 to 10.

7. A composition as in claim 1 wherein the synthetic rubber is a copolymer containing the monomers ethylene, propylene and ethylidene norbornene, containing from 70% to 30% ethylene, 30% to 70% propylene and 2% to 15 ethylidene norbornene; the value of the fraction is greater than 1.5 when $X_i$ is ethylidene norbornene and from 50% and 100% of the ethylidene norbornene is in molecules the molecular weight of which is less than the weight average molecular weight of the copolymer.

8. A composition as in claim 7 wherein the weight average molecular weight is from 200,000 to 750,000 and the molecular weight distribution is from 2 to 10.

9. A composition as in claim 1 comprising a blend of at least two synthetic rubbers.

10. A method of curing synthetic rubber compositions the major component of which comprises a copolymer containing at least one diolefin polymer or copolymer with another monoolefin having a weight average molecular weight of at least 50,000, a molecular weight distribution of from 1.01 to 30, the distribution of monomer units affecting the total crosslinking rate being such that when the value of the fraction $$\frac{G(\text{crosslink})_{X_i}}{\overline{G}(\text{crosslink})}$$

is greater than 1.5, from 50% to 100% of the monomer whose crosslinking rate contribution is represented by $G(\text{crosslink})_{X_i}$ is in molecules having a molecular weight less than the weight average molecular weight of the synthetic rubber, and when the value is less than 0.5 up to 50% of the monomer whose crosslinking rate contribution is represented by $G(\text{crosslink})_{X_i}$ is in molecules having a molecular weight less than the weight average molecular weight of the synthetic rubber; the value of said fraction in said composition being less than 0.5 or more than 1.5; said composition when substantially pure being radiation curable at an average radiation dose from about 0.5 to 7 megarads, which comprises subjecting said composition to high energy ionizing radiation to an average radiation dose of up to 15 megarads.

* * * * *